US008675076B2

(12) United States Patent
Varga et al.

(10) Patent No.: US 8,675,076 B2
(45) Date of Patent: Mar. 18, 2014

(54) SYSTEM FOR EMBEDDED VIDEO TEST PATTERN GENERATION

(75) Inventors: Gabriel Varga, Richmond Hill (CA); Greg Smith, Toronto (CA)

(73) Assignee: QUALCOMM Incorporated, San Diego, CA (US)

( * ) Notice: Subject to any disclaimer, the term of this patent is extended or adjusted under 35 U.S.C. 154(b) by 571 days.

(21) Appl. No.: 12/839,168

(22) Filed: Jul. 19, 2010

(65) Prior Publication Data

US 2011/0019006 A1 Jan. 27, 2011

Related U.S. Application Data

(60) Provisional application No. 61/227,379, filed on Jul. 21, 2009.

(51) Int. Cl.
*H04N 17/00* (2006.01)
*H04N 17/02* (2006.01)

(52) U.S. Cl.
USPC .......................................................... 348/181

(58) Field of Classification Search
USPC .......................................................... 348/181
See application file for complete search history.

(56) References Cited

U.S. PATENT DOCUMENTS

| | | | | |
|---|---|---|---|---|
| 4,322,749 A * | 3/1982 | Weston | ........................... | 348/181 |
| 4,357,703 A * | 11/1982 | Van Brunt | ..................... | 714/733 |
| 4,800,431 A * | 1/1989 | Deering | ......................... | 348/719 |
| 5,652,754 A * | 7/1997 | Pizzica | .......................... | 714/732 |
| 5,910,957 A * | 6/1999 | Kim | ............................... | 714/718 |
| 6,516,376 B1 * | 2/2003 | Christine et al. | .............. | 710/305 |
| 7,561,037 B1 * | 7/2009 | Monroe | ......................... | 340/521 |
| 2003/0112372 A1 * | 6/2003 | Weaver et al. | ................ | 348/555 |
| 2004/0208245 A1 * | 10/2004 | MacInnis et al. | ........ | 375/240.15 |
| 2005/0081130 A1 * | 4/2005 | Rinderknecht et al. | ........ | 714/726 |
| 2006/0020860 A1 * | 1/2006 | Tardif et al. | .................... | 714/724 |
| 2006/0107151 A1 * | 5/2006 | Mushirabad et al. | ......... | 714/733 |
| 2007/0011562 A1 * | 1/2007 | Alexander et al. | ............ | 714/758 |
| 2007/0182681 A1 * | 8/2007 | Kim | ................................ | 345/87 |
| 2009/0024892 A1 * | 1/2009 | Bussa et al. | ................... | 714/738 |
| 2009/0172488 A1 * | 7/2009 | Hasegawa et al. | ............ | 714/733 |
| 2010/0211748 A1 * | 8/2010 | Perego et al. | ................ | 711/148 |

\* cited by examiner

*Primary Examiner* — Nathan Flynn
*Assistant Examiner* — William J Kim
(74) *Attorney, Agent, or Firm* — Haynes and Boone, LLP (57) ABSTRACT

In accordance with some embodiments of the invention, a video processing circuit can include a synchronization generator to generate a clock signal from an input video stream; and a test pattern generator coupled to receive the clock signal provided by the synchronization generator and to generate a test pattern over a number of cycles. In accordance with some embodiments of the present invention, a video processing system may include an video input capture circuit; a video input processing circuit including a synchronization generator and a test pattern generator; a video scaling circuit; a video merging circuit to recombine the video signals provided by the video scaling circuit into one video signal; and a video output circuit including a cyclical redundancy check circuit.

18 Claims, 6 Drawing Sheets

SYSTEM FOR EMBEDDED VIDEO TEST PATTERN GENERATION

CROSS-REFERENCE TO RELATED APPLICATIONS

This application relates, and claims priority, to U.S. Provisional Patent Application No. 61/227,379, filed Jul. 21, 2009, the disclosure of which is incorporated by reference, in its entirety here for all purposes.

BACKGROUND

1. Field of the Invention

The embodiments described herein relate generally to test pattern generation and, more particularly, embedded test pattern generation in a video processing digital circuit.

2. Description of Related Art

The creation of highly integrated digital video processing electronics systems presents difficult design verification and test challenges. In conventional systems an external test pattern generator (Test Pattern Generator (TPG)) is utilized. An external test pattern generator has difficulty generating a full bandwidth image (i.e. 10-bit or 12-bit resolution image) due to the analog nature of the video digital-to-analog converter (DAC) typically included in external circuits. These limited test patterns contain random noise that distorts test results in high precision systems. Further, verification of specific hardware and software algorithms and systems requires tight integration with an external Test Pattern Generator (TPG), which is difficult to attain with conventional systems. Additionally, specialized test patterns are not available from external test pattern generators.

Therefore, there is a need for a method and device for generating test signals that better satisfies the need of testing specialized and high precision image display systems.

SUMMARY

In accordance with some embodiments of the invention, a video processing circuit may include a synchronization generator to generate a clock signal from an input video stream; and a test pattern generator coupled to receive the clock signal provided by the synchronization generator and to generate a test pattern over a number of cycles.

In accordance with some embodiments of the present invention, a video processing system may include an video input capture circuit; a video input processing circuit including a synchronization generator and a test pattern generator; a video scaling circuit; a video merging circuit to recombine the video signals provided by the video scaling circuit into one video signal; and a video output circuit including a cyclical redundancy check circuit.

Exemplary embodiments of the present invention will be described hereinafter in further detail, with reference to the following drawings.

DETAILED DESCRIPTION

The increase in complexity of advanced integrated circuits poses a challenge for design verification and silicon validation. The use of test pattern generators has typically been restricted to external equipment connected to the integrated circuit under test. Some embodiments of the invention embed a highly functional Test Pattern Generator (TPG) directly in-circuit to allow automatic design verification and validation.

As such, some embodiments of the present invention may include digital system self-testing during initial silicon validation without requiring external video test sources. Some embodiments may provide an automated and deterministic Silicon Functional Verification, wherein by deterministic it is meant real time functional verification. Further, embedded video test pattern generating circuits may provide verifiable functionality of all video computing paths, including a memory interface controller, at the specified video speed.

Some embodiments of the present invention may be programmable, testing a number of video modes using real frame sizes (e.g. 1080p or others) at real video pixel rates on a series of different video stream patterns. Further testing of bad-video, loss-of-video, and video-switching scenarios may be provided according to some embodiments of the present invention.

In some embodiments of the present invention, the video circuit test may be executed with the CPU running minimal code. Some embodiments may use an external system control to execute the video circuit test.

According to some embodiments of the present invention, a system including an embedded video test pattern generator may be free from uploading and downloading test and reference images or external images, for comparison. Thus, a system for video circuit testing according to some embodiments of the present invention may be more efficient and provide real time video adjustments. Furthermore, the system may perform direct tests on each major functional block; and allow checking of any pixel at arbitrary time intervals, to catch intermittent faults in the video display. In addition, some faults in the video display may be difficult to catch with the human eye until they have accumulated over a long period of time. These cumulative faults may be captured by the system for embedded video test pattern generation before they become problematic to the viewer, according to some embodiments of the present invention.

Further, some embodiments are capable of at-speed testing on application-specific integrated circuits (ASICs). For example, at-speed testing may be performed during a streaming video display, without interference with the continuity of the display. In some embodiments of the present invention, testing of the video display may be referred to as real time testing, or deterministic testing. Thus, deterministic testing of the full video data path and logic units on the integrated circuit may be provided by some embodiments of the present invention. Automatic characterization of internal video core operation at different voltage/temperature conditions may be provided. Thus, some embodiments of the present invention may provide diagrams such as 'Shmoo' plots, to assess the operating range of the system in real time.

Additionally, some embodiments of the invention are capable of testing embedded software; thus providing a consistent and predictable programmable video test pattern generator for fast boot-up and full self-diagnostics. In some embodiments of the invention, a system including embedded video test pattern generation circuit with a video processing digital circuit is presented.

Some embodiments of the present invention may further provide a method for automatic self-checking, system-level verification of complex digital video subsystems. Automatic verification of input and output video format timing for both hardware and software, and memory bandwidth analysis may also be provided in some embodiments. Thus, some embodiments of the present invention accelerate system-level verification and product qualification.

Some embodiments of the invention greatly simplify many verification problems by embedding a test pattern generator directly into the digital video system. Embedding the test pattern generator removes the need to rely on an external system with fewer capabilities. Some embodiments of the embedded test pattern generator allow for a full bandwidth generator. Further, some embodiments of the invention can provide tight video timing synchronization and hardware interlock to guarantee thorough internal validation and verification. Additionally, unique patterns designed specifically to aid in the characterization of clock jitter, frequency drive, and internal clock modulation can be provided according to some embodiments.

Figure 1:
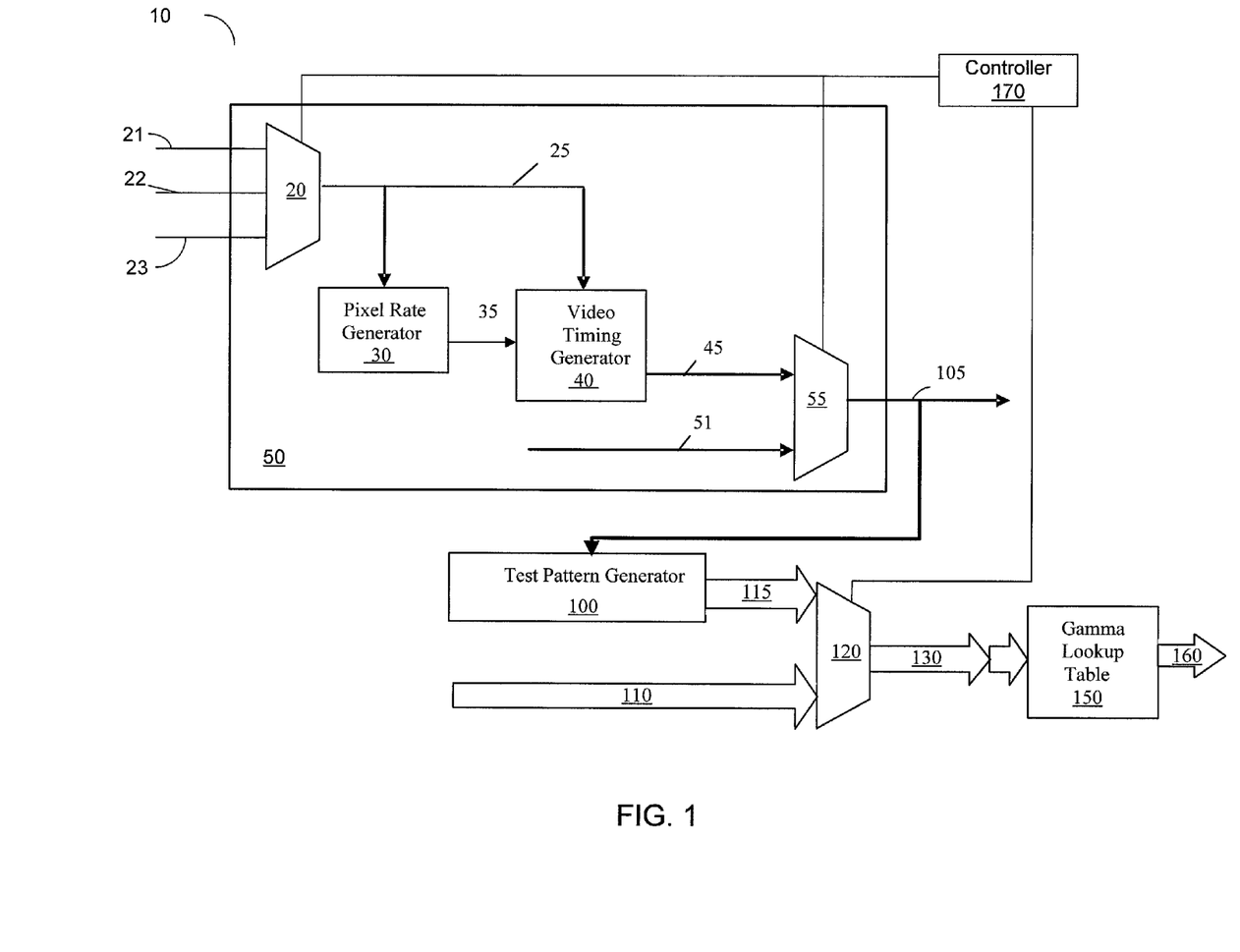
FIG. 1 illustrates a video digital processing system including an integrated test pattern generator (Test Pattern Generator (TPG)) according to some embodiments of the present invention.

FIG. 1 shows a system for embedded video test pattern generation 10 including synchronization generator 50 and Test Pattern Generator (TPG) 100, according to some embodiments of the present invention. According to FIG. 1 system clock 21, video input (VIN) clock 22, and video output (VOUT) clock 23 are provided to multiplexer block 20. Multiplexer 20 selects between clocks 21-23 to provide Test Pattern Generator (TPG) clock 25. The selection of clocks 21-23 may be based on an error detected by system 10 while performing a test. Clock 25 is then provided to pixel rate generator block 30 and video timing generator block 40. Pixel rate generator 30 provides pixel rate signal 35 to video timing generator block 40. Block 40 provides clock signal 45 including Horizontal Synchronization (HS), Vertical Synchronization (VS) and Data Enable (DEN) signals to multiplexer 55. Multiplexer 55 selects the clock signal that will be used to drive Test Pattern Generator (TPG) 100 between clock signal 45, and clock signal 51 from the input video signal. Clock signal 45 and clock signal 51 may be alternated, so that after a certain number of frames from input video signal have been displayed using clock signal 51, a certain number of test patterns may be displayed using clock signal 45. Clock signal 105 may be used to drive the rest of the digital circuitry and Test Pattern Generator (TPG) 100. Clock 105 includes synchronization signals to be used by the video test system, namely HS, VS, and DEN signals. Clock 105 ensures that Test Pattern Generator (TPG) 100 produce an image signal 115 that is synchronized to the output video signal.

According to some embodiments of the present invention, when system 10 is active the original input video data 110 is bypassed. When Test Pattern Generator (TPG) 100 is active, multiplexer 120 couples image signal 115 provided by Test Pattern Generator (TPG) 100 to display pixel data stream 130. When Test Pattern Generator (TPG) 100 is not active, multiplexer 120 couples input 110 to data stream 130. Data stream 130 is provided to Gamma lookup table 150. By strategic placement of Test Pattern Generator (TPG) 100 in the design, the video-path's existing Gamma lookup table 150 may be used to create sinusoids and other complex test patterns with minimal added logic.

Some embodiments of the present invention may use gamma lookup table 150 as follows: When generating periodic waveforms, some embodiments may generate 'sawtooth' or 'triangle' waves. Furthermore these 'sawtooth' and 'triangle' patterns may be 'rail to rail', that is, from the lowest to the highest pixel intensity value. If a downstream mapping function (such as gamma table 150) is available to effectively form part of the TPG, these waveforms can be converted to sine waves or other waveforms. For example, pattern 330 may be generated in the same way as pattern 320 using a table to convert the triangle wave in pattern 320 to the sinusoid in pattern 330 (cf. FIG. 3 below).

Some embodiments of the present invention such as depicted in FIG. 1 may place TPG 100 'upstream', in front of Gamma lookup table 150. Thus, the output of TPG 100 may drive the index of lookup table 150. The output of Gamma table 150 may be a series of values stored in the locations of lookup table 150 addressed by the data in TPG 100. In this way, arbitrary waveforms may be easily generated simply by preloading lookup table 150 with a preselected pattern. For example, if Gamma table 150 is preloaded with values for a sinusoid, then a wire range of sinusoidal waveforms may be generated simply by programming the TPG to produce a triangle or 'sawtooth' wave. The coefficients of TPG 100 may be programmed to increase/decrease the period of the triangle/sawtooth wave over time as a function of position in the image. Thus, two-dimensional sinusoidal frequency sweep patterns may be generated without additional logic.

According to some embodiments of video processing system 10 shown in FIG. 1, clock signals 21, 22, and 23 may be separately tested for error. The testing of clock signals 21, 22, and 23 may be performed using a controller 170, according to some embodiments of the present invention. System 10 further determines whether the error is caused by input clock signal 51. For example, when an error is detected, multiplexer 20 may select system clock 21 to generate clock 105. If the error persists when clock 21 is being used, then system 10 uses multiplexer 20 to select VOUT clock 23 for driving clock 105. Using clock 23 to drive clock 105 allows system 10 to determine whether a clock domain crossing issue occurs. If using clock 23 also produces error, then all sub-blocks are individually driven and tested by controller 170 in system 10 to locate the source of the error.

Figure 2:
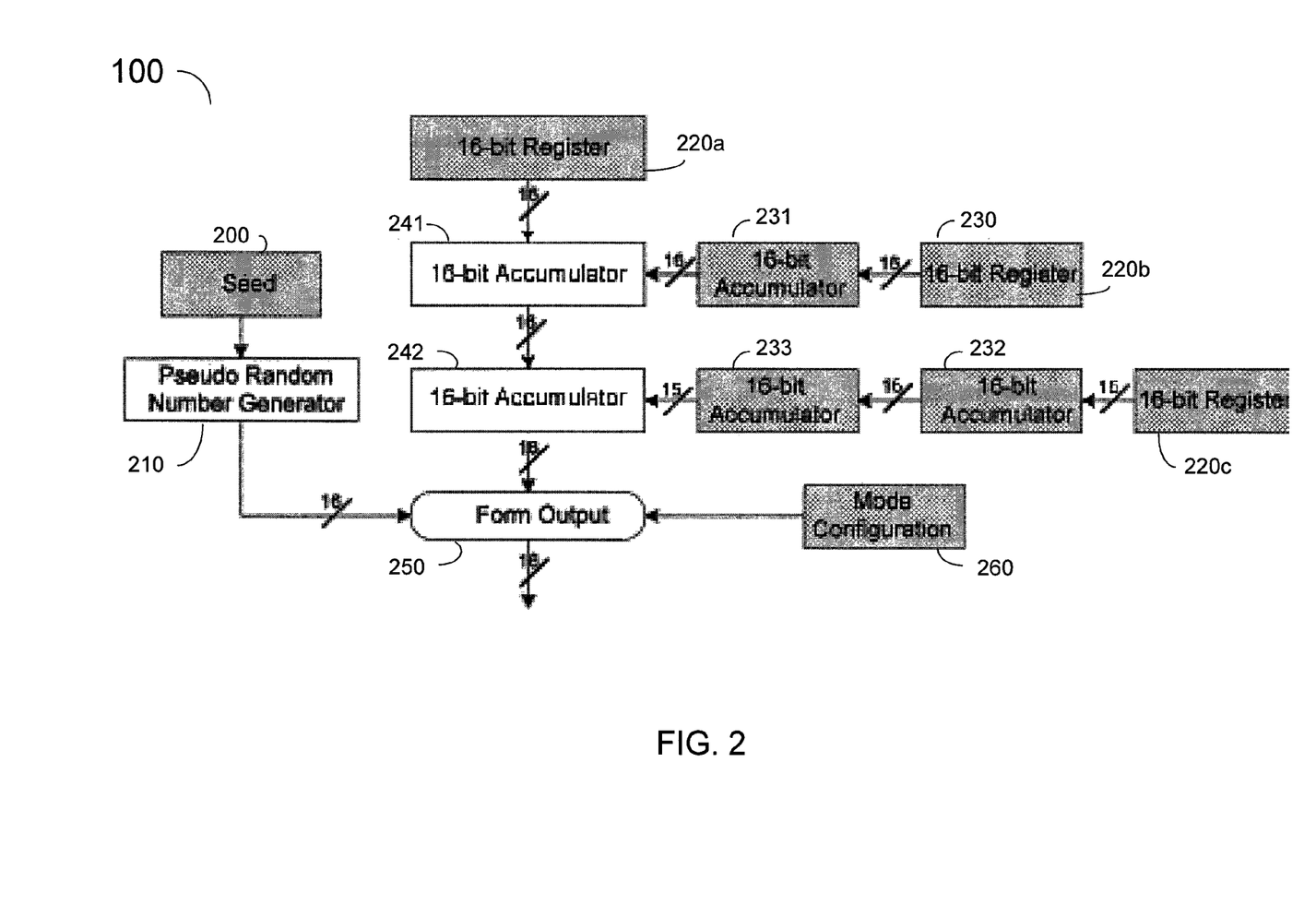
FIG. 2 illustrates an embodiment of a test pattern generator that can be utilized in embodiments of the invention such as that shown in FIG. 1.

FIG. 2 illustrates a test pattern generator (Test Pattern Generator (TPG)) 100 according to some embodiments of the present invention. The 16-bit accumulators 231-233, and 241-242, and pseudo random number generator 210 shown in FIG. 2 provide a robust set of 2nd order difference engines. Test Pattern Generator (TPG) 100 generates a set of values for each pixel in a video frame by performing the sequence of operations depicted in FIG. 2 in one cycle for each pixel, according to some embodiments of the present invention. In some embodiments of the present invention, each set of values may determine the color intensity for all colors assigned by Test Pattern Generator (TPG) 100 to a particular pixel. Accumulators 231, 233, 241, and 242 provide values to variables according to the values attained by these variables in previous cycles. Thus, the steps depicted in FIG. 2 may be performed recursively, for a number of N cycles, according to some embodiments of the present invention.

Figure 3:
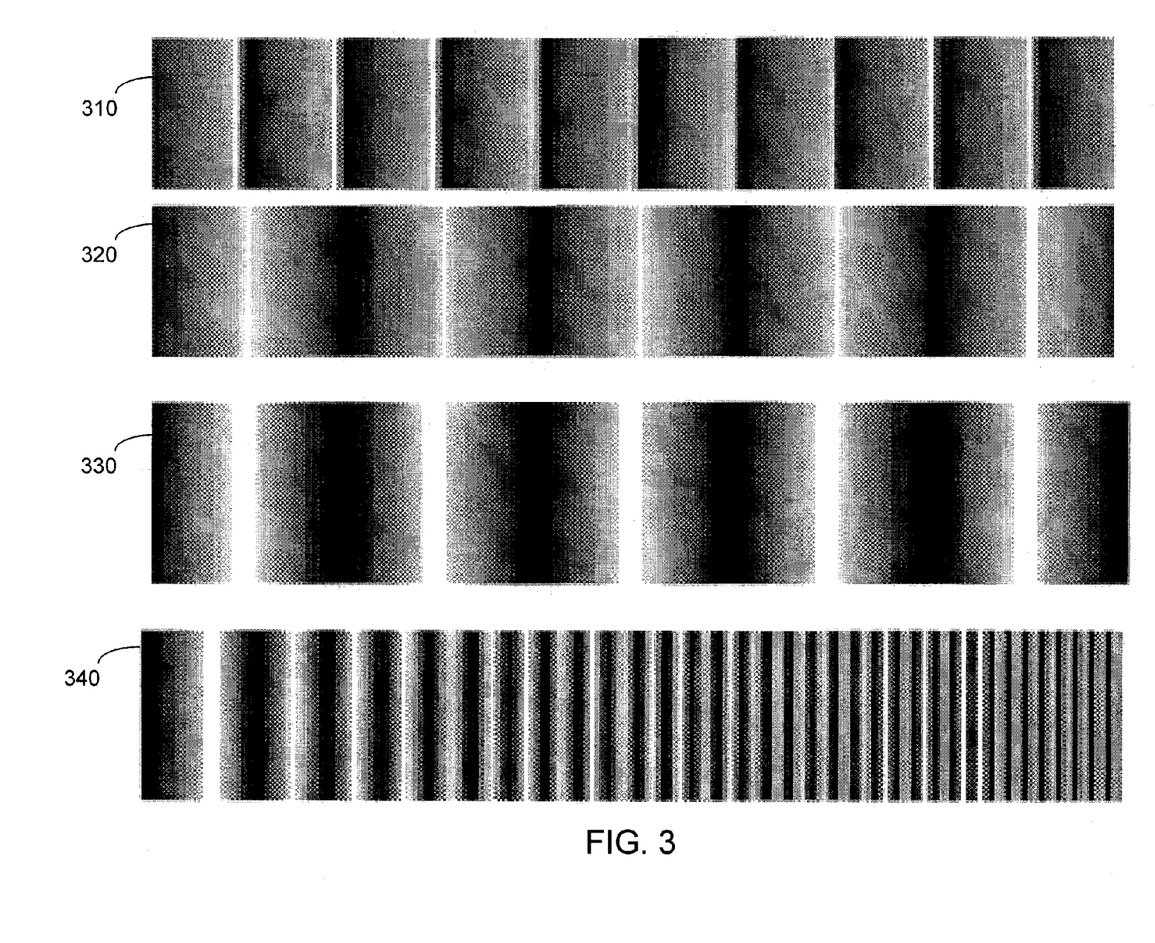
FIG. 3 illustrates a triangle, sinusoid, and frequency sweep pattern that can be generated by the test pattern generator shown in FIG. 2.
Figure 4:
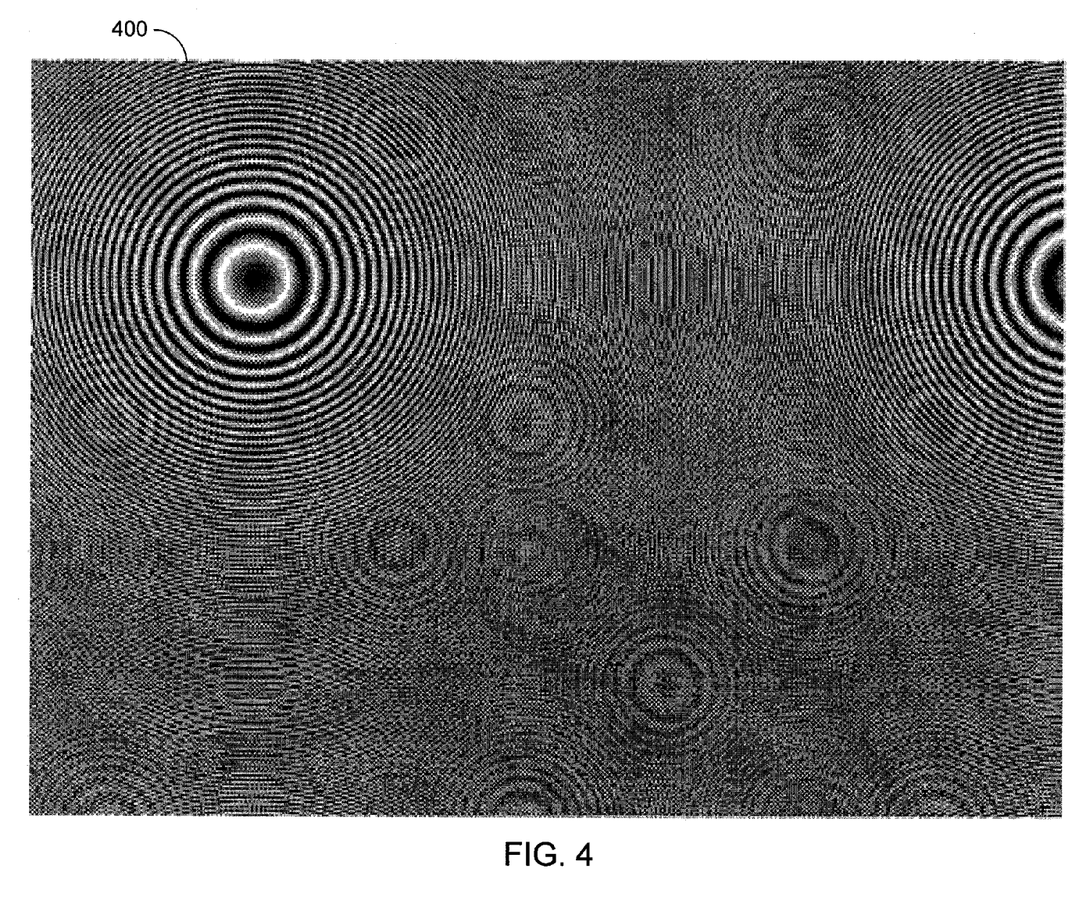
FIG. 4 illustrates a zone plate test pattern that can be generated by the test pattern generator shown in FIG. 2.
Figure 5:
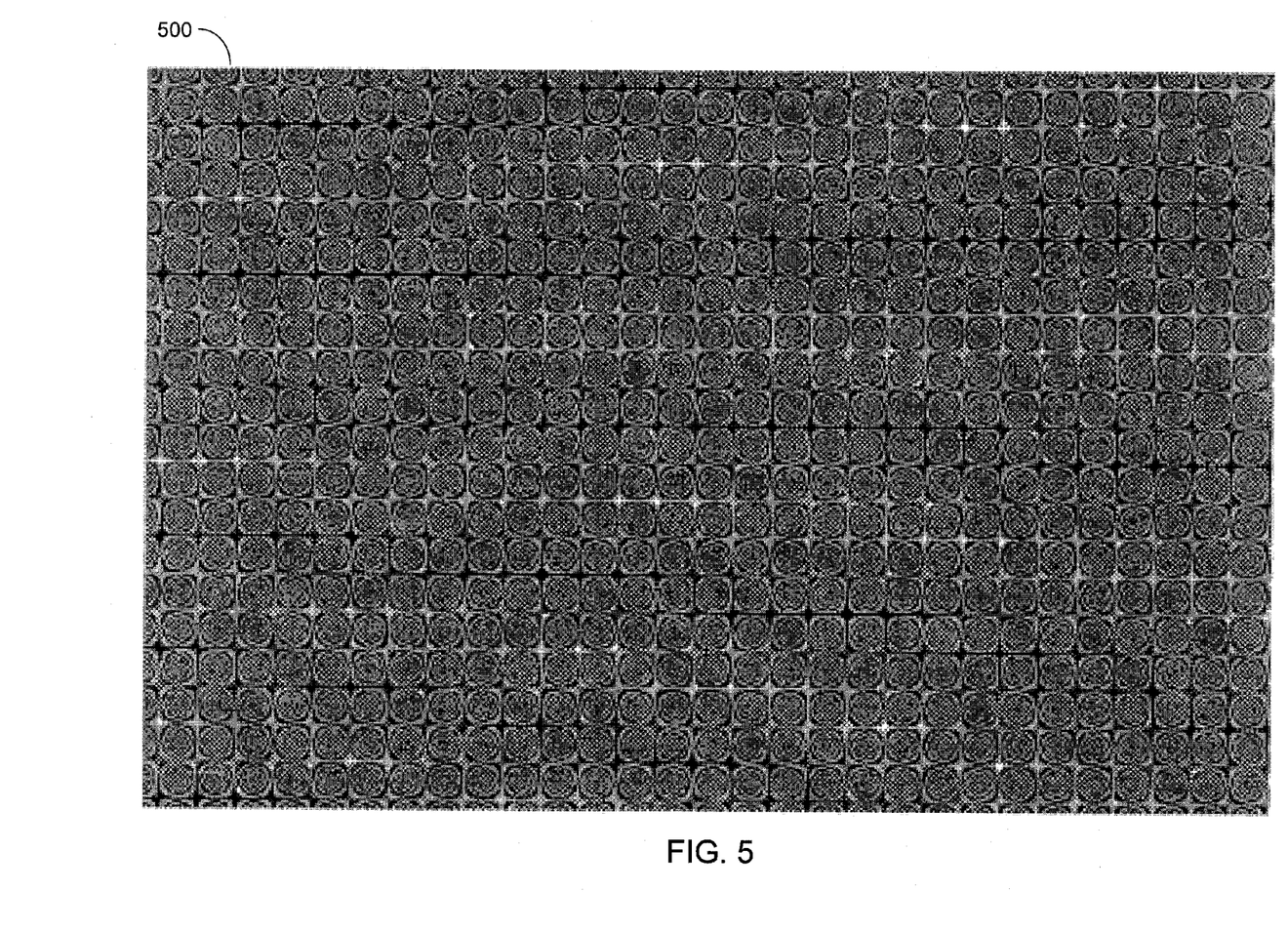
FIG. 5 illustrates a repetitive pattern test pattern that can be generated by the test pattern generator shown in FIG. 2.

The configuration of each accumulator 231-233, 241-242 allows for test patterns 310-340 (cf. FIG. 3), 400 (cf. FIG. 4)

and 500 (cf. FIG. 5), to be produced using only a few programmable registers. Registers 220a-c provide constants that are used in the procedure to modify the features of the pattern that is being generated. The test patterns thus generated and others may be used to exhibit the features discussed earlier. Mode configuration block 260 provides a menu of different patterns that may be used.

The embodiment depicted in FIG. 2 uses five (5) input values: seed 200, mode configuration 260, and three registers 220a-c. Mode configuration 260 may be a 5-bit number. For example, value 260 may determine whether or not form output 250 should be 'complemented.' This may be a 'triangle wave mode,' since the output will ramp up and down continuously, as accumulator 242 increases (cf. pattern 320 in FIG. 3 below). Some embodiments may not complement form output 250. In this case the resulting pattern may be wrapping in a 'saw tooth' fashion (cf. pattern 310 in FIG. 3 below). Seed value 200 may be an 8-bit integer, used for random number generator 210. Generator 210 provides variability to the test patterns generated by Test Pattern Generator (TPG) 100, thus avoiding the video system to be 'trained' for specific patterns.

In the embodiments depicted in FIG. 2, all calculations are performed modulo $2^{16}$. The use of limiting operations or rounding operations may be chosen in some embodiments. In some embodiments, an initial rounding in control values may produce an error that may accumulate as the calculation proceeds. In some embodiments of the present invention, the calculation procedure starts with the first pixel in the display, at the top-left corner of the frame. As the calculation proceeds, the pixels are selected horizontally from left to right, and vertically from top to bottom. Each horizontal line in the frame may be completed before moving down in the vertical direction in the frame.

For example, some embodiments of the invention as depicted in FIG. 2 may provide initial values $X_0$ in register 220a, $Y_0$ in register 220b, and $Z_0$ in register 220c. Furthermore, variable $R_1$ may be associated to accumulator 241, and variable $R_2$ associated to accumulator 242. Variable $Y_1$ may be associated to accumulator 231, and variables $Z_1$ and $Z_2$ may be associated to accumulators 232 and 233, respectively. Thus, in this embodiment the values of variables $Y_1$, $R_1$, $Z_1$, $Z_2$, and $R_2$ provided to output 250 in cycle 'i+1' from the values of the variables $X_0$, $Y_0$, $Z_0$, $Y_1$, $R_1$, $Z_1$, $Z_2$, and $R_2$ in cycle 'i' are given by Eqs. (1)-(10) below.

To produce the first output pixel on each row:

$$R_2^{i+1} = Z_2^i; \quad (1)$$

$$R_1^{i+1} = Y_1^i; \quad (2)$$

$$Z_2^{i+1} = Z_1^i + Z_2^i; \quad (3)$$

$$Z_1^{i+1} = Z_1^i + Z_0; \quad (4)$$

$$Y_1^{i+1} = Y_1^i + Y_0; \quad (5)$$

In Eqs. (1)-(5), the index 'i' may refer to the row number in a test frame. Thus, the operations described in Eqs (1)-(5) may be carried out a number of cycles, N, equal to the total number of horizontal lines in the test frame, according to some embodiments of the present invention.

Further, the following operations may be carried out to produce each subsequent output pixel along each horizontal row in a test frame:

$$R_2^{i+1} = R_1^i + R_2^i; \quad (6)$$

$$R_1^{i+1} = X_0 + R_1^i; \quad (7)$$

$$Z_2^{i+1} = Z_2^i; \quad (8)$$

$$Z_1^{i+1} = Z_1^i; \quad (9)$$

$$Y_1^{i+1} = Y_1^i; \quad (10)$$

In Eqs. (6)-(10), the index 'i' may refer to the pixel number in a horizontal row of a test frame. In some embodiments of the present invention, the number of cycles, K, to perform Eqs. (6)-(10) is equal to the total number of pixels in each horizontal row of the video frame. In some embodiments of the present invention, the sequence of K-cycles in Eqs. (6)-(10) may be repeated for each of the horizontal lines in the video frame, until all the horizontal lines have been included. For example, the sequence of K-cycles in Eqs. (6)-(10) may be repeated N times, according to Eqs. (1)-(5) above, where N may be equal to the total number of horizontal lines in the test frame.

FIG. 3 shows different test patterns that may be used according to some embodiments of video test system 10. For example, some embodiments of the present invention may form patterns having a saw-tooth profile such as pattern 310. Other embodiments may have a triangular profile, such as pattern 320, a sinusoidal profile as in pattern 330, or a frequency sweep profile with decreasing period as in pattern 340. Patterns 310-340 in FIG. 3 may be obtained following the operations described in FIG. 2 above, by a suitably chosen mode configuration, the seed value, and appropriate constants in registers 220a-c.

FIG. 4 shows pattern 400 that may be generated using test pattern generator 100 as described in relation to FIG. 2 above.

FIG. 5 shows pattern 500 that may be generated using test pattern generator 100 as described in relation to FIG. 2 above.

Figure 6:
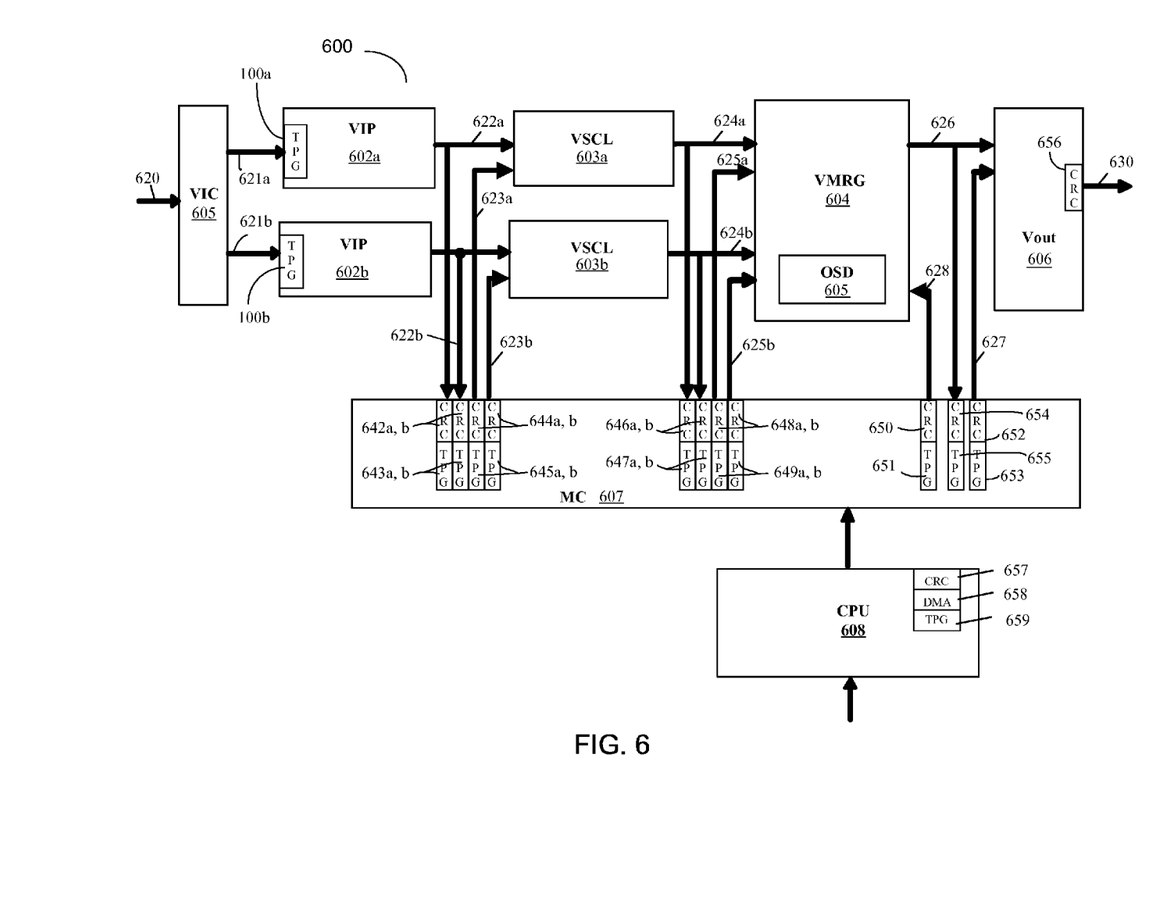
FIG. 6 illustrates a system for integrated test pattern generators according to some embodiments of the present invention.

FIG. 6 illustrates an embodiment of this invention having embedded Test Pattern Generator (TPG)'s in video processing system 600. Video processing system 600 includes a video input capture (VIC) block 605, video input processing (VIP) blocks 602a and b, video scaling (VSCL) blocks 603a and b, video merging (VMRG) block 604, and Video output (Vout) block 606. Some embodiments of video processing system 600 may further include memory controller (MC) 607, and central processing unit (CPU) 608, as depicted in FIG. 6.

During normal operation, video input signal 620 is provided to VIC 605. In some embodiments of the present invention, VIC 605 may separate input video signal 620 into signals 621a and 621b, to increase processing efficiency. Signals 621a and 621b are provided to the VIP 602a and 602b, respectively. In some exemplary embodiments of system 600, signals 621a and 621b may represent different portions of a display. In some embodiments of system 600 VIC 605 may output only one video signal, or more than two video signals. VIPs 602a and b may include various video processing sub-blocks to perform processing operations such as noise reduction and contrast enhancement. VIPs 602a and b may further include Test Pattern Generator (TPG) circuits 100a and b, as depicted in FIG. 1. In some embodiments of the present invention, when Test Pattern Generators (TPGs) 100a and b are active then VIP 602a and b provide a test pattern video signal to system 600.

Image signals 622a and b are provided by VIPs 602a and b to the VSCLs 603a and b to scale images 622a and b according to the size of the display. Scaled video signals 624a and b are provided to VMRG 604, where signals 624a and b are recombined. According to some embodiments of the present invention, VMRG 604 may include on-screen display (OSD) block 605 to controls an image superimposed onto video signal 620. The image that OSD 605 superimposes on video signal 620 may be a video test pattern provided by Test Pattern Generator (TPG)s 100a and b, or 651 as discussed below. OSD 605 typically displays information such as channel number (for broadcast television systems), volume, and display settings menu. The output 626 of VMRG 604 is provided to Vout 606 to create video output signal 630.

To perform a test of the entire system 600, Test Pattern Generator (TPG)S 100a and b may generate a test pattern that replaces input video signals 621a and b. The test pattern generated by Test Pattern Generator (TPG)s 100a and b is provided to VSCLs 603a and b. In VMRG 604 the test pattern and the input video stream are combined such that any correction that needs to be performed to the video display is introduced in the digital data stream. Thus, output video data stream 630 is produced in block 606, where CRC 656 may provide a check of VOUT stream 630 before it is sent out of video processing system 600.

According to the embodiment depicted in FIG. 6, blocks 602a and b, 603a and b, and 604 may write data to and read data from MC 607, as the video signal is processed. The input and output of MC 607 may include cyclical-redundancy-checkers (CRCs) 642a and b, 644a and b, 646a and b, 648a and b, 650, 652, and 654. The CRC circuits depicted in FIG. 6 create unique digital signatures for each video frame passed through the system. Some embodiments of the present invention may include Test Pattern Generator (TPG) circuits 643a and b, 645a and b, 647a and b, 649a and b, 651, 653, and 655 in MC 607, coupled to the CRC circuits as shown in FIG. 6.

According to some embodiments of the invention depicted in FIG. 6, CRCs 650, 652, and 654 are coupled to Test Pattern Generator (TPG)s 651, 653, and 655, respectively. Test Pattern Generator (TPG) 653 and CRC 652 may provide a video test pattern and a signature associated with the test pattern to Vout 606. Thus, data stream 630 may include a video test pattern as part of the output stream. Likewise, Test Pattern Generator (TPG) 651 and CRC 650 may provide a video test pattern and a signature associated with the test pattern to OSD 605.

The embodiment illustrated in FIG. 6 may exhibit many desirable features. According to some embodiments of system 600, central processing unit (CPU) 608 may configure Test Pattern Generator (TPG)s 100a and b, 643a and b, 645a and b, 647a and b, 649a and b, 651, 653, 655, and 656 to generate various patterns required to debug or verify the system. Test Pattern Generator (TPG) circuits as depicted in FIG. 6 may generate test patterns and the CRC circuits may compare the test patterns with a golden signature to detect a fault. Using this combination of test pattern and digital CRC signatures resolves many of the issues discussed above in reference to the related art.

In some embodiments of the present invention, OSD 605 in VMRG 604 may receive a test pattern from Test Pattern Generator (TPG) 651 and CRC 650 in MC 607, and display it directly on screen. VMRG 606 then analyses the display from OSD 605, compares the results with the input from VSCL 603a and b, and provides a corrected video data stream 626 to VOUT block 606.

Further embodiments of the invention as depicted in FIG. 6 may be applied to any kind of data processing unit or set of cascaded processing modules. Embodiments of the present invention may not be limited to systems having scaling blocks 603a and 603b, or merging block 604.

Embodiments of the invention described above are exemplary only. One skilled in the art may recognize various alternative embodiments from those specifically disclosed. Those alternative embodiments are also intended to be within the scope of this disclosure. As such, the invention is limited only by the following claims.

What is claimed is:

1. A video processing circuit, comprising:
a synchronization generator to generate a clock signal selectively based on one of an input video stream clock signal and an alternate clock signal, the alternate clock signal being selectively chosen from one of a plurality of clock signals; and
a test pattern generator coupled to receive the clock signal provided by the synchronization generator and to generate a test pattern over a number of cycles, the test pattern generator including at least two accumulators coupled in series, such that one of the at least two accumulators receives only an output from another of the at least two accumulators.

2. The video processing circuit of claim 1 wherein the synchronization generator comprises:
a test pattern generator clock;
a pixel rate generator providing a pixel rate signal;
a video timing generator to provide the clock signal using the pixel rate signal; and
a multiplexer to select between a clock signal from an input video stream and the clock signal provided by the video timing generator to provide a clock signal to the video processing circuit.

3. The video processing circuit of claim 2 wherein the test pattern generator comprises:
a pseudo random number generator to provide variable test patterns;
a register to provide initial values to the test patterns;
an accumulator to accumulate values from previous cycles; and
a mode configuration block to select a test pattern.

4. The video processing circuit of claim 3 wherein
the circuit provides the test pattern to an output video stream; and the circuit further comprises a lookup table to obtain a digital signature from the input video frame and the test pattern.

5. The video processing circuit of claim 1 further comprising a controller circuit to test the clock signal provided to the video processing circuit.

6. A video processing system, comprising:
a video input capture circuit;
a video input processing circuit comprising a synchronization generator and a test pattern generator, the test pattern generator including at least two accumulators coupled in series, such that one of the at least two accumulators receives only an output from another of the at least two accumulators;
a video scaling circuit;
a video merging circuit to recombine the video signals provided by the video scaling circuit into one video signal; and
a video output circuit comprising a cyclical redundancy check circuit.

7. The video processing system of claim 6 wherein the synchronization generator further comprises:
a test pattern generator clock;
a pixel rate generator providing a pixel rate signal;
a video timing generator to provide a clock signal using the pixel rate signal; and
a multiplexer to select between a clock signal from an input video stream and the clock signal provided by the video timing generator.

8. The video processing system of claim 6, further wherein:
the test pattern generator generates a test pattern over a number of cycles; and the cyclical redundancy check circuit provides a unique digital signature for each video frame passed through the system.

9. The video processing system of claim 8 wherein the test pattern generator further comprises:
a pseudo random number generator to provide variability to the test patterns;
at least one register to provide initial values to generate the test patterns;
a mode configuration block to select a test pattern; and
a lookup table to obtain a digital signature from the input video frame and the test pattern.

10. The system as in claim 6 further wherein the video input processing circuit performs noise reduction and contrast enhancement to the input video signal.

11. The system as in claim 6 further comprising
a memory controller unit coupled to the video input processing circuit, the video scaling circuit, the video merging circuit, and the video output circuit; the memory controller further comprising:
at least one test pattern generator; and
at least one cyclic redundancy check (CRC) circuit; and
a computer processor unit (CPU) coupled to the memory controller unit to control the forming of test patterns.

12. The system as in claim 11 where the CPU further comprises:
at least one test pattern generator to provide test patterns to the memory controller; and
at least one cyclic redundancy check (CRC) circuit to create unique digital signatures for each video frame and each test pattern.

13. The system as in claim 6 further wherein the video merging circuit comprises an on-screen display to control an image superimposed onto the video signal provided by the video scaling circuit.

14. The system as in claim 13 further wherein the image superimposed onto the video signal provided by the video scaling circuit is a test pattern provided by the test pattern generator in the memory controller circuit.

15. A method to generate test patterns comprising the steps of:
generating a pseudo random number to provide variability to the test patterns;
providing initial values to at least one register to generate the test patterns;
determining a number of cycles to use for generating the test patterns with a test pattern generator;
providing values from previous cycles using at least two accumulators coupled in series, such that one of the at least two accumulators receives only an output from another of the at least two accumulators;
selecting a test pattern using a mode configuration block; and
obtaining a digital signature from an input video frame and the test pattern by using a lookup table.

16. The video processing circuit of claim 1, wherein the alternate clock signal is selectively chosen from one of: a system clock, a video input clock, and a video output clock.

17. The video processing system of claim 1, wherein the test pattern generator comprises:
a first register connected to a first accumulator;
a second register connected to a second accumulator; and
a third register connected to a third accumulator.

18. The video processing system of claim 17, wherein the second accumulator is connected to the first accumulator, such that data moves from the second register through the second accumulator to the first accumulator.

* * * * *